(12) United States Patent
Srivastava (10) Patent No.: US 7,617,230 B2
(45) Date of Patent: Nov. 10, 2009

(54) FINDING SIMILARITY AMONG SETS OF COORDINATED TASKS

(75) Inventor: Biplav Srivastava, Uttar Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 11/191,672

(22) Filed: Jul. 28, 2005

(65) Prior Publication Data

US 2007/0027881 A1 Feb. 1, 2007

(51) Int. Cl.
*G06F 17/30* (2006.01)
(52) U.S. Cl. .................. 707/101; 707/100; 717/101
(58) Field of Classification Search .............. None
See application file for complete search history.

(56) References Cited

U.S. PATENT DOCUMENTS

| | | | | |
|---|---|---|---|---|
| 5,839,112 | A * | 11/1998 | Schreitmueller et al. | 705/4 |
| 6,772,407 | B1 | 8/2004 | Leymann et al. | 717/100 |
| 2002/0038217 | A1 | 3/2002 | Young | 705/1 |
| 2004/0119752 | A1 | 6/2004 | Beringer et al. | 715/779 |
| 2004/0148299 | A1 * | 7/2004 | Teegan et al. | 707/100 |
| 2004/0187089 | A1 | 9/2004 | Schulz | 717/104 |
| 2004/0220910 | A1 * | 11/2004 | Zang et al. | 707/3 |
| 2005/0043982 | A1 | 2/2005 | Nguyen | 705/8 |
| 2005/0251501 | A1 * | 11/2005 | Phillips et al. | 707/2 |
| 2006/0074732 | A1 * | 4/2006 | Shukla et al. | 705/8 |
| 2006/0106846 | A1 * | 5/2006 | Schulz et al. | 707/101 |
| 2006/0107265 | A1 * | 5/2006 | Schulz et al. | 718/100 |

OTHER PUBLICATIONS http://www-106.ibm.com/developerworks/webservices/library/ws-bpel/.*
X. Fu, T Bultan and J. Su, "Analysis of Interacting BPEL Web Services", In 13th International Worm Wide Web Conferenc(WWW 2004.), NY, May 2004, ACM Press.*
Verifying BPEl Workflows under Authorization Constraints. Zhao Xiangpeng et al. copyright 2006. http://www.springerlink.com/content/d18177562579k/fulltext.pdf.*
Generate BPEL for JBoss workflow engine. Copyright date 2006. Visual Paradigm Resource. http://resource.visual-paradigm.com/vpsuite2.3s[2/generate_bpel_for_jboss.html.*
What is BPEL and why is it so important to my business? White Paper by Micheal Cobban. 2004. http://www.softcare.com/whitepapers/wp_whatis_bpel.php.*

* cited by examiner

*Primary Examiner*—Neveen Abel Jalil
*Assistant Examiner*—Kellye D Buckingham
(74) *Attorney, Agent, or Firm*—Gibb I.P. Law Firm, LLC (57) ABSTRACT

The described workflow analysis techniques generalize activity instance information into activity context information so that activities can be analyzed in the presence of other possible activities, and by extension, other workflows. Generalization is made possible by deriving an action model for each activity, in which each model specifies contexts for preconditions and postconditions. These contexts are necessary and sufficient in defining each activity, and can be further populated with metadata. The derived activity contexts can be used for analyses that are not possible using existing approaches.

7 Claims, 7 Drawing Sheets

FINDING SIMILARITY AMONG SETS OF COORDINATED TASKS

FIELD OF THE INVENTION

The present invention relates generally to finding similarity among sets of coordinated tasks. In one particular form it relates to analyzing workflows specified using a workflow specification language.

BACKGROUND

One form of a 'coordinated set of tasks' is a workflow. A workflow is a specification of activities where the activities may themselves be automated or manual. BPEL4WS ("BPEL" for short) is a recent workflow specification language for automated activities, such as composite network-accessible services. Workflows can be created by humans from scratch, or can be created using automated methods from reusable, simpler services.

Workflows are intended to achieve some one or more useful goals. For a given workflow, users may want to analyze how the workflow causes the goals to happen and—in some cases—whether or not the workflow achieves the goals at all. Analysis of this sort encompasses the following aspects a workflow:

Workflow selection
Workflow storage and retrieval
Workflow updates and obsoletion
Workflow generation No guarantee can be made with human constructed workflows concerning how the goals are achieved, since there may be unintended errors. Workflow analysis provides methods to assess workflows over their life cycle in a changing world.

Current approaches to workflow analysis are based on existing program analysis techniques. These approaches take the workflow as input (e.g., BPEL) and convert into an internal representation (such as an automata) and analyze the behavior of the internal representation (e.g., automata) based on static analysis methods. (Refer to X. Fu, T. Bultan and J. Su, "Analysis of Interacting BPEL Web Services", In $13^{th}$ International World Wide Web Conference ('WWW 2004.), NY, May 2004, ACM Press.)

The current program analysis based techniques provide limited information about a workflow. This information is restricted to the current instance of program execution, and is insufficient for managing a workflow over time, as instance level information is subject to frequent change.

Further, there is no contextual information of why an activity is in the workflow and what role the activity plays. Such information would allow workflows to be better used, updated with time, stored and retrieved, etc. In the absence of context information, current approaches model BPEL as a petri-net, process algebra or automata, and perform reasoning for properties only on runtime activity description.

SUMMARY

Workflow analysis is used to assess workflows over their life cycle, through the stages of generation, selection, storage, retrieval, update and obsolescence. Workflows embodying the invention are analyzed in the context of the activities rather than instances of the activities.

The described workflow analysis techniques generalize activity instance information into activity context information (referred to herein as "derived context") so that activities can be analyzed in the presence of other possible activities, and by extension, other workflows. Generalization is made possible by deriving an action model for each activity, in which each model specifies contexts for preconditions and postconditions. These contexts provide a first definition for each activity, and can be further populated with metadata. The derived activity contexts can be used for analyses that are not possible using existing approaches.

The results of such analyses can facilitate improved decision-making over the life cycle of the workflow. Particular examples include the availability of:

a) informative metadata while managing workflows;
b) visual representations of complex workflows through abstraction; and
c) new applications using generalized workflows.

DESCRIPTION OF DRAWINGS

FIG. 1 is a schematic representation of a workflow represented in the BPEL specification language.

FIG. 2 is a flow diagram of building a semantic action model for each activity in a workflow.

FIG. 3 is a schematic representation of a semantic action model for the workflow of FIG. 1.

FIG. 4 is a flow diagram of building a semantic action model for grouping activities.

FIG. 5 is a schematic representation of a multiply-grouped workflow.

FIG. 6 is a schematic representation of the workflow of FIG. 5 in a transformed form.

FIG. 7 is a schematic representation of a computer system suitable for performing the techniques described herein.

DETAILED DESCRIPTION

As noted above, Business Process Execution Language for Web Services (BPEL for short) is a workflow specification language that is used to represent workflows. BPEL expresses interactions and message exchanges between partner entities that can be automatically interpreted and executed by a workflow engine. BPEL is used extensively to express composite web services in conjunction with Web Services Description Language (WSDL) standards, where the latter describes the interfaces of the partner services.

A BPEL workflow specification contains description of runtime instance of operations that can be performed on domain resources. The workflow specification may contain information about partners and their roles, message types, variables and activities. Activities are of two categories—basic activities and group activities. Basic activities can be executed and include: invoke, receive, reply, throw, terminate, wait, nothing, and data handling activity of assign. Group activities structure basic activities and include: sequence, switch, while, pick, and flow. The semantics of the grouping activities and the link information determines the exact control flow of the BPEL program. The variables and assign statements determine the data flow. Both synchronous and asynchronous invocations are supported. The messages are syntactically described using schema defined in the Extensible Markup Language (XML) in either a BPEL file, or a referenced WSDL file.

Figure 1:
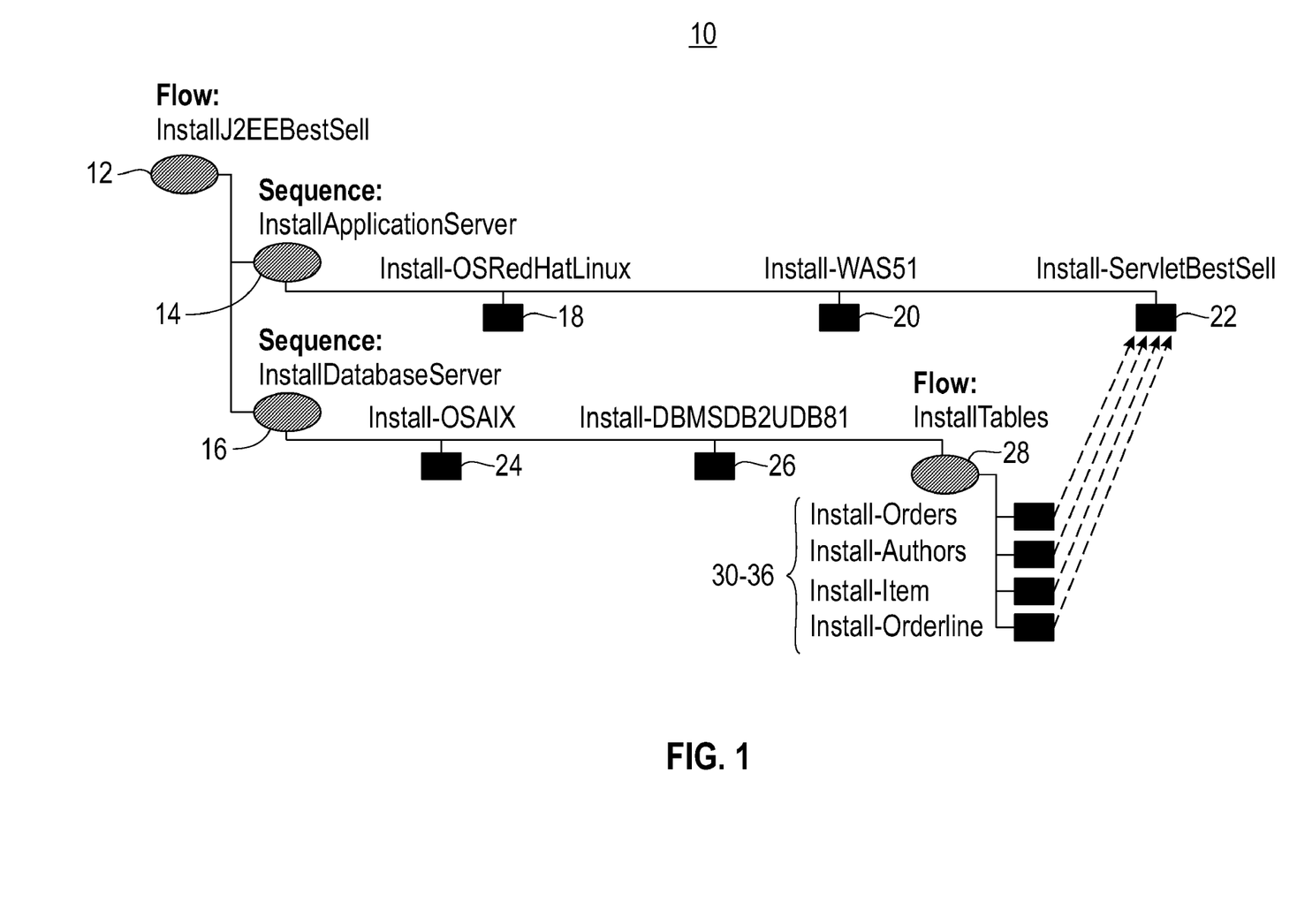

FIG. 1 shows a BPEL workflow that installs a single servlet InstallJ2EEBestSell 10. The workflow of the servlet 10 contains a top-level flow 12 into which two sequences InstallApplicationServer 14 and InstallDatabaseServer 16 are embedded that run in parallel inside the flow. The sequence 14 installs the application server, and contains three basic activities: installing a Linux operating system 18, installing a Websphere Application Server (WAS) 20, and installing the desired servlet 22. The sequence 16 installs a database server. There are two activities: installing an AIX operating system 24 and installing a DB2 database 26. There follows another flow 28, in which four activities 30, 32, 34, 36 are embedded that install database tables, possibly in parallel. The dashed arrows denote explicit synchronization dependencies between the activities 22 and 30-36. In this example, the database tables must be installed before the servlet installation can start, which is the last activity of the sequence 14. All basic activities are of the type invoke and represented as squares, and describe executable system scripts.

A. Generalization of Workflow—Basic Activities

A semantic action model is generated for each activity in the workflow specification 10 that represents the model of an operation on the domain entity. The semantic action model is useful for analyzing an operation's relationship with other operations in the domain. The approach taken is as follows:

1. Interpret control flow ordering information as possible causal dependency on states before and after an operation.
2. Refine possible dependencies using domain metadata to remove redundancy by identifying equivalent causation add new dependencies.

Building a Semantic Action Model for Each Activity

Figure 2:
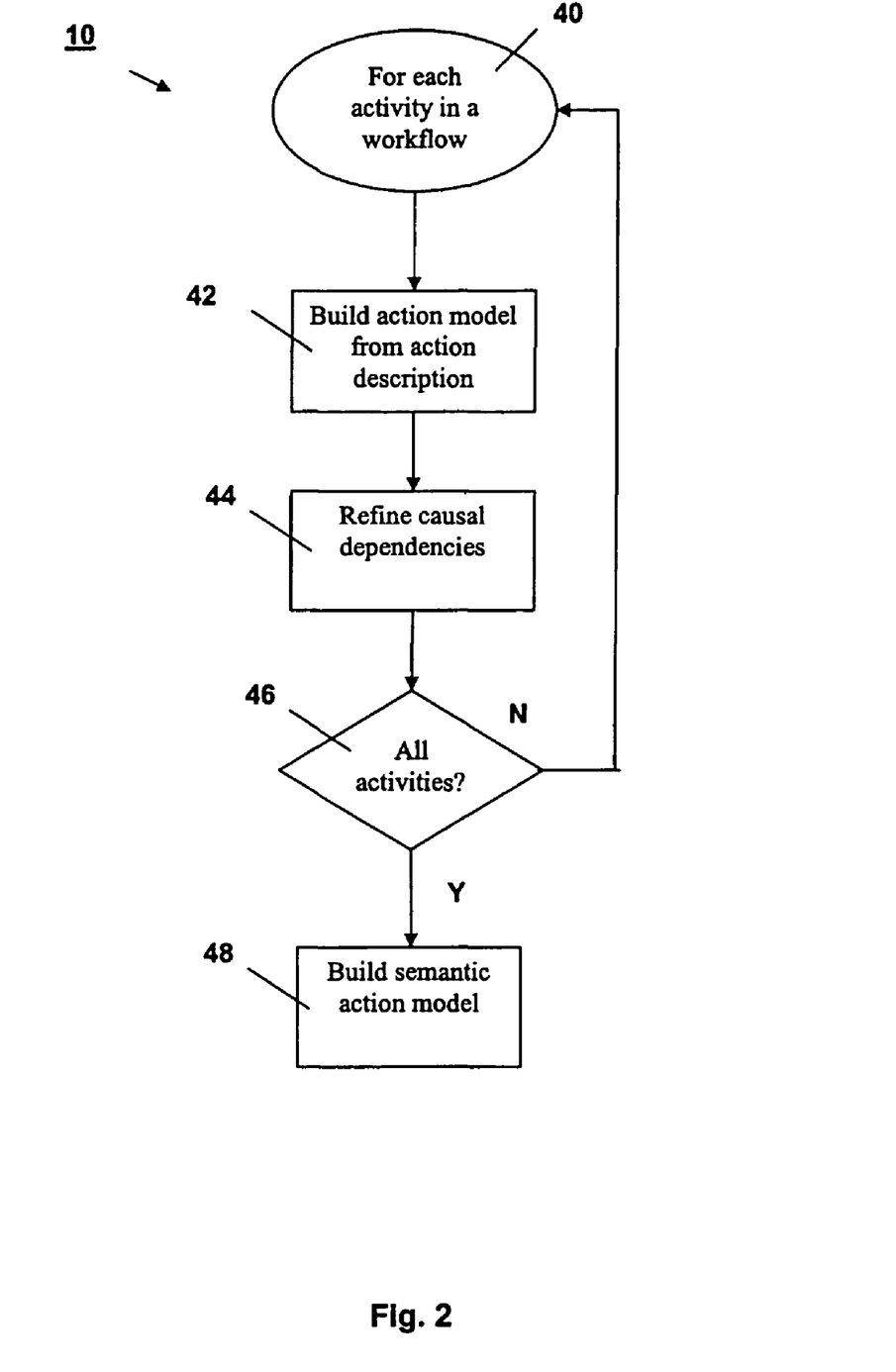

As shown in FIG. 2, the workflow specification 10 is traversed top-to-bottom, and an action model is built for each activity. That is, for each activity 40 in the workflow 10, an action model is built from the action description (step 42). Each action model is refined according to causal dependencies (step 44). When all activities has been processed (step 46), the semantic action model is built (step 46).

Building an Action Model from Each Action Description

In building the action model (step 42), two sub-processes are performed: collecting actions and building those actions' preconditions and effects.

Table 1 below is a pseudo code listing for recursively visiting activities of a workflow and collecting actions.

TABLE 1

```
// Recursively visit activities of the workflow and collect actions
01.     List visitActivityOfBPEL(bpelLeftToRead, parentActionNode) {
02.         List actionsList = {}
02.     For each sibling activity, aNode of bpelLeftToRead
03.         Action act = new Action(aNode);
04.         Mark act's action type based on aNode
05.         If parentActionNode is condition
06.             Mark act as conditional
07.         End-If
08.         If aNode is a basic activity (e.g. Invoke)
09.             // Set up act's preconditions and effects
10.             act = buildActionSemanticModel( act, aNode)
11.         End-If
12.         Add act to actionsList
13.         actionsList U= visitActivityOfBPEL(aNode.children, act);
14.     End-for
15.     Return actionsList;
16. }
```

The procedure visitActivityOfBPEL( )—used in the pseudo code of Table 1 above—takes the root of the parsed BPEL fragment and recursively calls itself to build actions corresponding to BPEL activities and add actions elements to the workflow plan.

The preconditions and effects of actions are populated in the routine buildActionSemanticModel( ). The aim of the routine is to build a causal model of an activity from only control-flow/ordering information.

The procedure uses BPEL links explicit in the BPEL workflow specification to come up with the first iterative set of preconditions and the effects of activities using the links' target and source, respectively. If the BPEL links are missing, the procedure automatically adds links from a predecessor to mark the action's preconditions, and adds to the successor to mark the actions postconditions. A decision is made if a new link has to be introduced or an old link is to be used. This corresponds to identifying if the context (state) before or after activities are similar.

The following rules are used:

a) children of flow and sequence have the same precondition context.
b) children of a switch, pick and while have different precondition context.
c) a basic activity's precondition context depends on the context of its ancestors leading to the nearest ancestral basic activity.
d) the context of a basic activity's postcondition is different among siblings.

Finally, the preconditions of earliest actions can be interpreted as the initial conditions that enable the workflow to become applicable and the postconditions of the latest actions are interpreted as the goals that the workflow supports.

Table 2 below presents pseudo code for building an action's preconditions and effects.

TABLE 2

```
//Build an action's preconditions and effects.
01. IAction buildActionSemanticModel(act, aNode) {
03.     Update act as follows:
04.         For each link whose source is aNode
05.             Make the link's target activity as the
06.                 effect of act
07.         End-for
08.         For each link whose target is aNode
09.             Make the link's source activity as the
10.                 precondition of act
11.         End-for
12.         If aNode has no links and it is a basic activity,
13.             Make the predecessor as precondition
14.             Make aNode as the effect of predecessor
15.         End-if
16.     Return act
17. }
```

Refining Causal Dependencies

There are some constraints in BPEL which, if addressed, can help build more informative action models and, consequently, more informative analyses. The issue is that one takes BPEL activities (syntactic nodes) and tries to model semantics around them. The only information about dependency that is available is through links and their condition, and the semantics of group activities (i.e., sequence, switch, etc.). BPEL links only convey ordering but not complete causality. They can have arbitrary names and there is no way to discover properties such as "the same effect is being used by multiple consumers", unless there is additional metadata. A link always connects two activities and has a distinct name. In contrast, one can express that a postcondition can serve multiple preconditions of different nodes with explicit action specification available with a planner such as Planner4J as part of the input (Planner4J: Biplav Srivastava, "A Software Framework for Applying Planning Techniques", *Proc. Knowledge Based Computer Systems (KBCS* 2004), Hyderabad, India 2004, incorporated herein by reference).

Building Semantic Action Model

The semantic action model is built form the component action models with dependencies using the pseudo code shown in Table 3.

TABLE 3

```
01.     For each basic activity n in P
02.         Create a, a specification corresponding to n
03.         Populate a as follows:
04.             For each link in L whose source is n
```

TABLE 3-continued

```
05.         Include the link's name in postconditions of a
06.     End-for
07.     For each link in L whose target is n
08.         Include the link's name in preconditions of a
09.     End-for
10.     Add a in A
11. End-for
12. Return A
```

The following pre- and postconditions are derived for the action Install-ServletBestSell

```
Action (Install-ServletBestSell
    :parameters ( )
    :precondition: a & b & c & d & e
    :postcondition: f
```

The specification for the sequential activity InstallApplicationServer is as follows:

```
Action (InstallApplicationServer[Sequence]
    :parameters ( )
    :precondition weakest projected preconditions . . .
    :structural precondition
    :postcondition strongest projected postcondition . . .
    :structural postcondition
            Install-OSRedHatLinux[Invoke]
            Install-WAS51[Invoke]
            Install-ServletBestSell[Invoke]
```

The structural precondition is empty as there is no nested receive activity. The "structural" postconditions contain the names of the three nested basic activities. The "normal" pre- and postconditions are calculated from the pre- and postconditions of the nested activitites.

Figure 3:
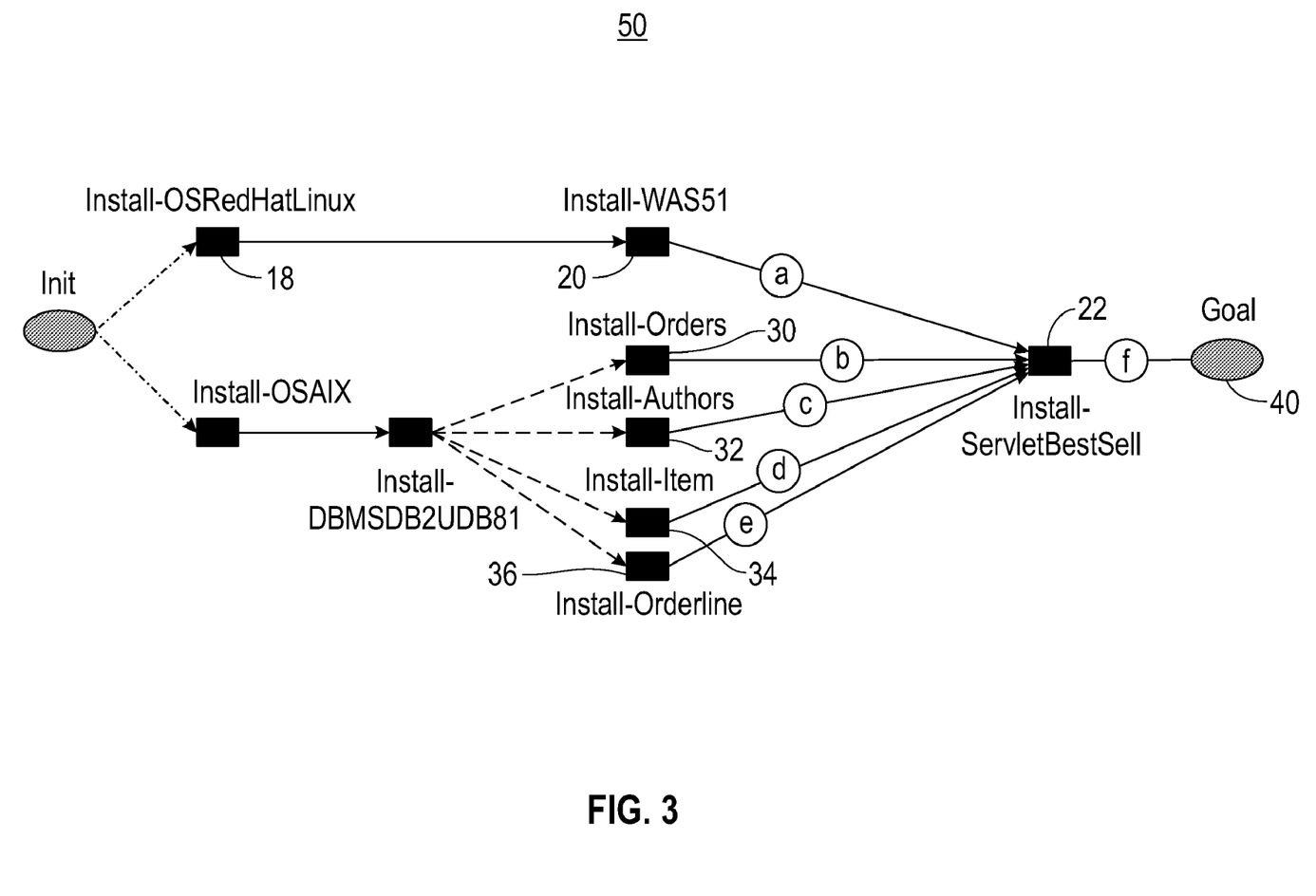

FIG. 3 shows a semantic action model 50 for the workflow 10 shown in FIG. 1 according to the process of FIG. 2. New links a-e have been created for ordering among sequentially stacked actions 30-36. These actions, Install-Orders, Install-Orderline, Install-item, Install-Authors, are executed in the same context (pre and post), hence are replaceable. The action Install-ServletBestSell 22 is the most constraining action, deducable by a simple count of the number of pre- and postconditions of that action.

In summary, information obtained by the plan analysis can now be used as metadata to manage the workflow and derive similarity. The metadata can be:

1. Properties of a set of states as metadata. In the example, new state-dependency links were created to make the ordering and thereby causation) among actions explicit. The links represent states between actions and new metadata involving properties of possible states can be recorded, e.g. equivalent causation.
2. The specifications of actions and their properties as metadata. The actions Install-Orders, Install-Authors, Install-Item, and Install-Orderline are executed in the same context (pre- and postconditions). Hence, they may be performing similar things and, if additional metadata suggests, they may be interchangable.
3. New statistics from analysis output as metadata (e.g. Install-ServletBestSell is the most constraining action).

B. Generalization of Workflow—Grouping Activities

As only basic activities are eventually executed, the grouping activities of a BPEL workflow specification are treated differently from basic activities.

Figure 4:
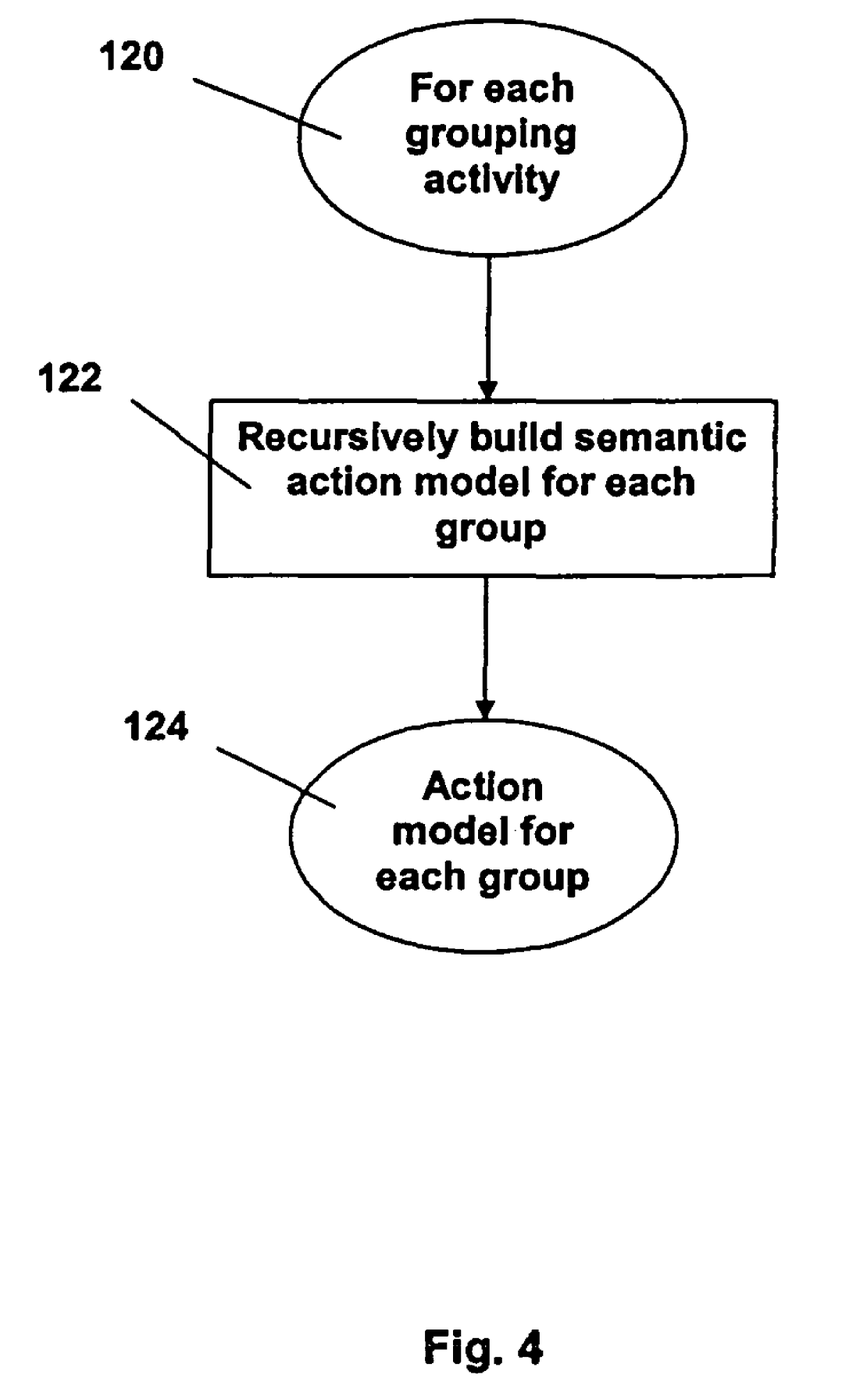

Referring now to FIG. 4, for each group activity 120 in the workflow 90, a semantic action model is built recursively for each node from the bottom up to the root node (step 122) to derive an action model 124 for each grouping activity.

In modeling the group activities, the action model 46 of the basic activities can be used. Given a group activity G like flow, the following steps are taken:

interpret receive as precondition
  interpret invoke, reply, throw, . . . as postconditions
  interpret grouping sub-activities as effects
  temporal ordering of activities in G is ignored The individual grouping models are combined recursively in a 'bottom up' manner to give action models for intermediate group nodes in the workflow, and finally the root node.

As a procedure, this would be, for example, according to the procedure DeriveGroupActivityModel given below.

```
Procedure: DeriveGroupActivityModel(GroupActivity G) {
a) Build an empty Action Model of G
b) For each child c,
c)      If c is of type receive, include it as precondition
d)      If c is of type invoke, reply, throw, . . . , other primitive action,
included it as postconditions
e)      If c is a grouping sub-activities,
f)          If c has to be expanded
g)              Update ActionModel with DeriveGroupActivityModel(c)
h)      Else
I)          Include c as postconditions
J)      Ignore temporal ordering of activities in G
}
```

C. Transformed Workflows

Figure 5:
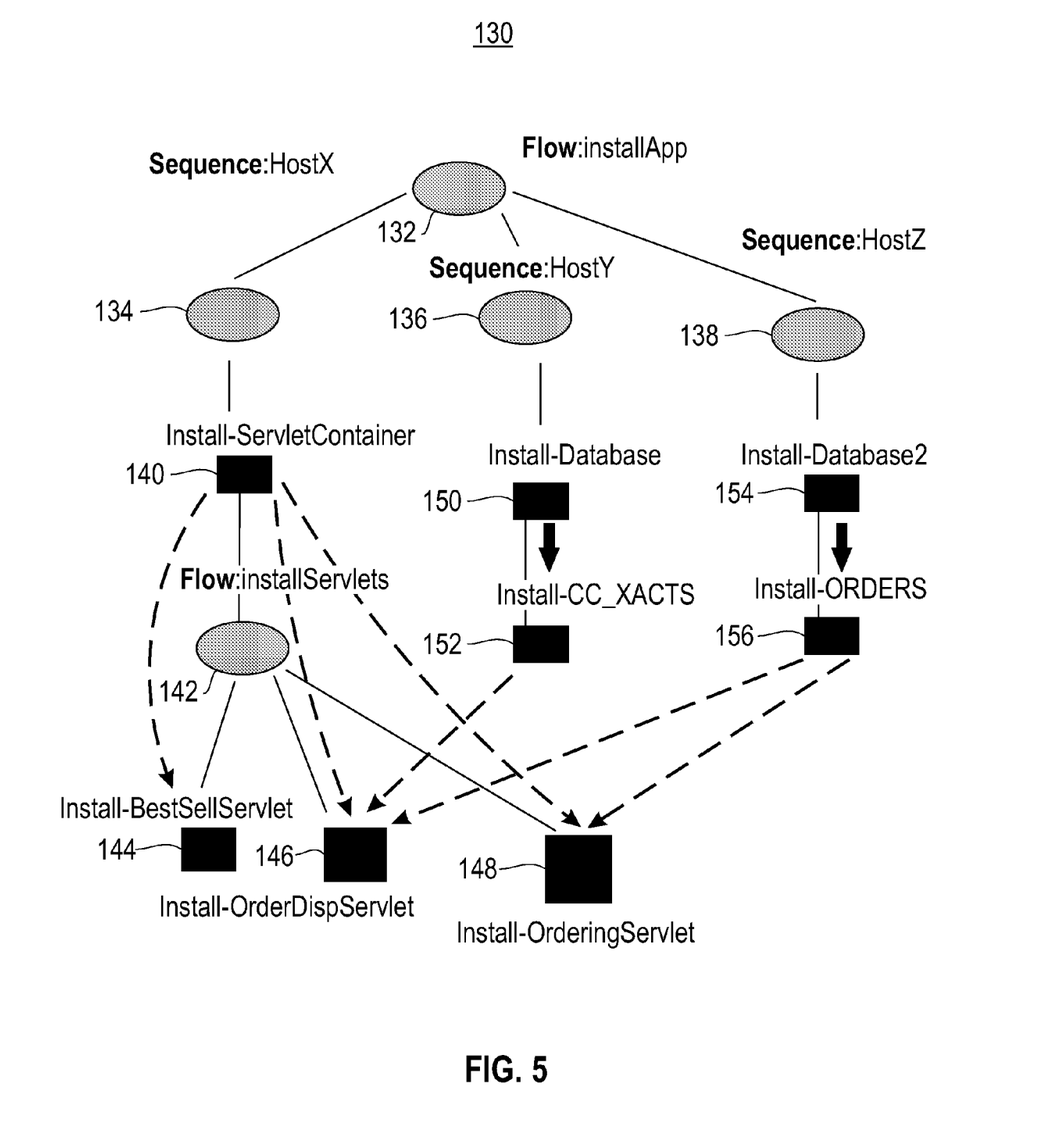

FIG. 5 shows a multiply-grouped workflow 130 to install an application that further consists of sub-flows for installing a servlet container and two databases. The workflow 130 has a top-level flow 132 with three dependent sequences: HostX 134, HostY 136 and HostZ 138. The HostX sequence 134 has an activity Install-ServletContainer 140, folled by a sub-flow install servlets 142, in turn followed by three dependent activities Install-BestSellServlet 144, Install-OrderDispServlet 146 and Install-Ordering Servlet 148. The HostY sequence 136 has two sequential dependent activities: Install-Database 150 and Install-CC_XACTS 152. The HostZ sequence 138 has two sequential dependent activities: Install-Database2 154 and Install-ORDERS 156. The dashed arrows denote synchronization dependencies.

Figure 6:
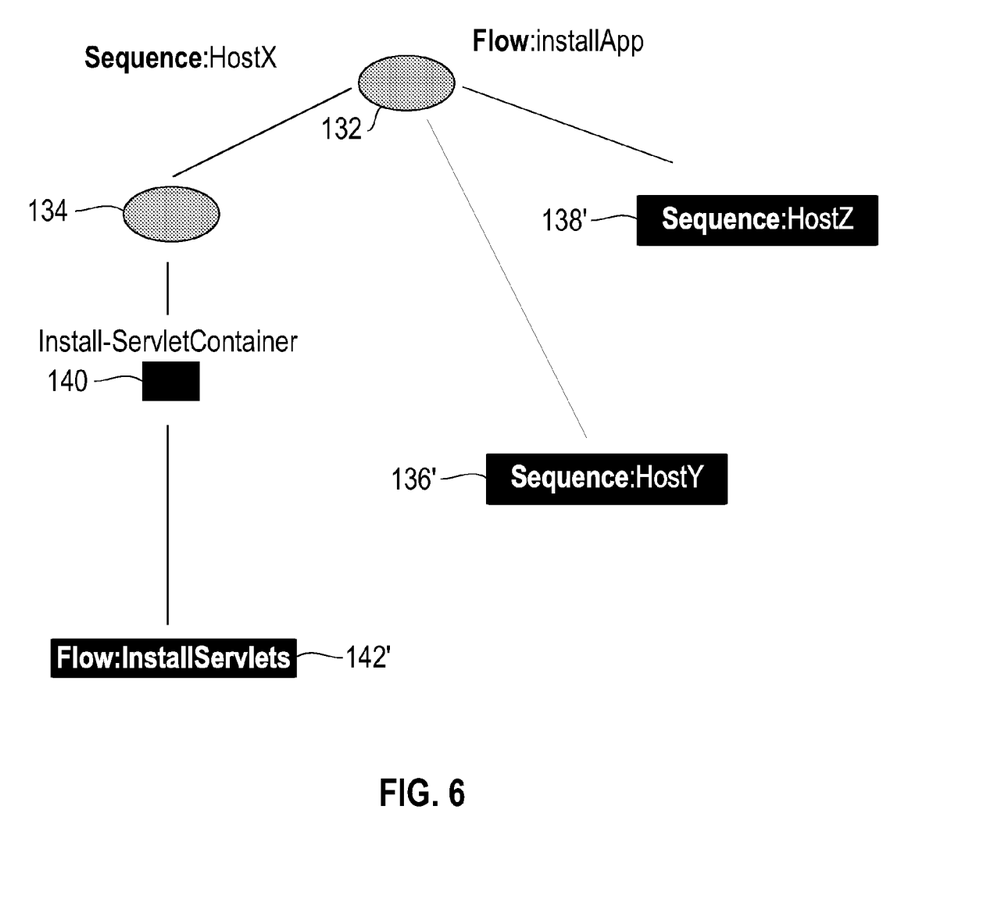

FIG. 6 shows the transformed workflow 160 generated in accordance with the transformation of basic activities and grouped activities (as discussed above). By replacing the sub-workflows (i.e. Flow:InstallServlets 142, Sequence:HostX 136 and Sequence:HostZ 138) in the workflow 130 by the action models 142', 136', 138' of the grouping actions at these points, a simpler visualization of the workflow is obtained. This simplified representation can also be used for finding similarity among workflows, searching workflows in a database and generating templates.

Extensions

The procedure of transforming workflows into action models consisting of contexts for preconditions and postconditions can also be used to simplify visualization of complex workflows, and used to identify similar workflows and generalize these workflows to identify templates.

A template is a collection of workflows with similar structure. For example, web applications need installation of servlets and databases. The installation of these applications will have two parallel paths about the installation of the sub-components. So, one can generalize from a few web application installation workflows about the general workflow template.

Template Example:

Given the following workflow instances for web application installation:

Workflow 1 has a 2-step sub-workflow to install servlets and a 2-step sub-workflow to install database tables; workflows 2 and 3 have varying length sub-workflows for the two sub-components.

X, Y, A and B are variables below

```
Flow:InstallApplication
    Sequence:InstallServletContainer      Servlet:InstallDatabase
        Install-ServletX                      Install-TableA
        Install-ServletY                      Install-TableB
        . . .                                 . . .
``` from a few workflows as:

```
Workflow1
Flow:InstallApplication
    Sequence:InstallServletContainer      Servlet:InstallDatabase
        Install-Servlet1                      Install-Table1
        Install-Servlet2                      Install-Table2
        . . .                                 . . .
```

```
Workflow2
Flow:InstallApplication
    Sequence:InstallServletContainer      Servlet:InstallDatabase
        Install-Servlet11                     Install-Table4
        Install-Servlet23
```

```
Workflow3
Flow:InstallApplication
    Sequence:InstallServletContainer      Servlet:InstallDatabase
        Install-Servlet1                      Install-Table111
                                              Install-Table221
```

Action models are built for the grouping sub-components for each of the workflow, and then generalized to obtain a template.

In the above, each workflow instance can have action models for the sub-flows as below in an instance-independent manner. Here, [X], [A] are variables.

```
Flow:InstallApplication
    Action[Sequence:InstallServletContainer]      Action[Sequence:InstallDatabase]
    Pre: <>                                       Pre: <>
        Post: Install-Servlet[X ]                     Post: Install-Table[A]
            [. . .]                                       [. . .]
```

This is generalized to a web application installation template shown below by replacing the action model of the two sequences with the postcondition elements.

Generated Template:

```
Flow:InstallApplication
    Sequence:InstallServletContainer      Sequence:InstallDatabase
        Install-Servlet[X ]                   Install-Table[A]
        [. . .]                               [. . .]
```

Templates help in generalizing concrete instances and understanding the nature of workflows. A patch installation workflow will follow a different pattern/template. This can be used to categorize workflows.

In addition to structural abstraction, the names of the activities can also be abstracted if these names follow a general pattern.

Properties for Analysis

Using the derived action model 124, the following analysis and updating of the workflow plan's meta-data is performed.

Plan Analysis on Given Plan

The properties of plans are computed. The basic properties considered are:

1. length of plan: # of time steps in the plan, as given
2. concurrency in the plan: How many parallel actions can be executed?
3. exposure of conditions in average length and average duration
4. critical nodes (actions)
5. critical edges (conditions)
6. minimal correctness of the plan.

The last 3 properties are further detailed below.

1. A plan is called satisfied if all its preconditions are supported.
2. A plan is called justified if no action is redundant—i.e., at least on of its effects has to be utilized by a successor.
3. A plan is safe if for all links, no condition is deleted/clobbered between its provider and consumer.
4. A condition on a link (edge) is critical if supported by only one provider.
5. An action (node) is critical if at least one of its preconditions is critical.
6. A plan is minimally correct if it is satisfied, justified and safe.

Plan Analysis Using Simulated Execution Environment

Figure 7:
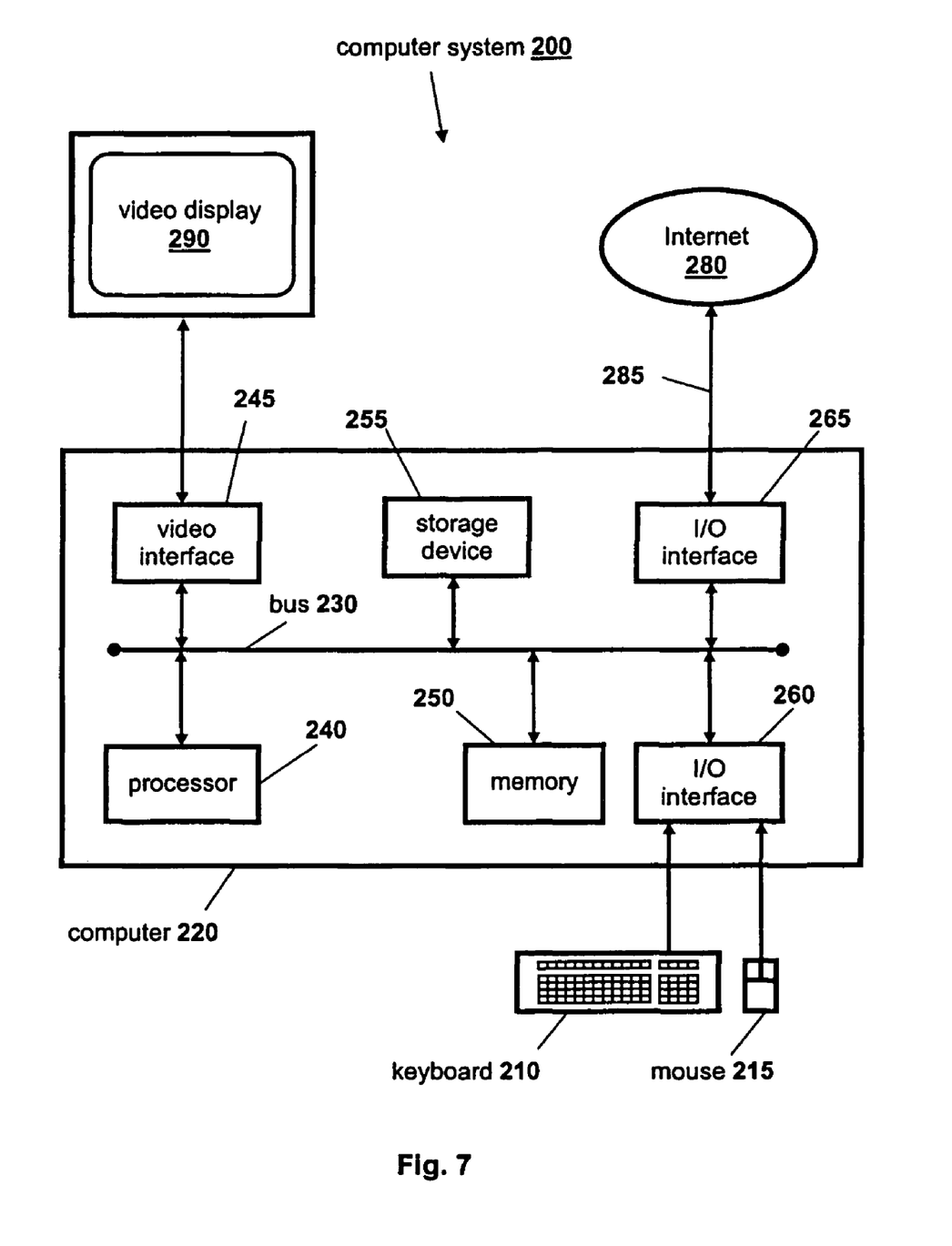

The execution of the plan and computation of its properties is simulated. The description of the initial and goal states is known, and the actions are known to varying degrees—apart from their preconditions and effects, their probability of success, cost utility, duration, etc can be known. The properties that can be considered are as follows:

1. Plan's relevance in the planning problem (plan's applicability in the initial state and achievement of the goal/maintenance of goals)
2. Plan's probability of success
3. Plan's utility (expected benefit−expected cost)
4. Plan's risk in violating an SLA (constraint).
5. Expected resource consumption Plan Analysis Using a Repository Relevant plans/compute properties are determined for the given plan using planner meta-data information from a repository of plans. As an example the properties/plans one can consider are:
1. Plans that achieve similar goals
2. Plans that use similar actions
3. Plans that have similar structures
4. Plans applicable in similar context
5. Plans with same annotation of properties Computer Hardware FIG. 7 is a schematic representation of a computer system 200 suitable for executing computer software programs performing the methods described above. Computer software programs execute under a suitable operating system installed on the computer system 200, and may be thought of as a collection of software instructions for implementing particular steps.

The components of the computer system 200 include a computer 220, a keyboard 210 and mouse 215, and a video display 290. The computer 200 includes a processor 240, a memory 250, input/output (I/O) interface 260, communications interface 265, a video interface 245, and a storage device 255. All of these components are operatively coupled by a system bus 230 to allow particular components of the computer 220 to communicate with each other via the system bus 230.

The processor 240 is a central processing unit (CPU) that executes the operating system and the computer software program executing under the operating system. The memory 250 includes random access memory (RAM) and read-only memory (ROM), and is used under direction of the processor 240.

The video interface 245 is connected to video display 290 and provides video signals for display on the video display 290. User input to operate the computer 220 is provided from the keyboard 210 and mouse 215. The storage device 255 can include a disk drive or any other suitable storage medium.

The computer system 200 can be connected to one or more other similar computers via a communications interface 265 using a communication channel 285 to a network, represented as the Internet 280.

The computer software program may be recorded on a storage medium, such as the storage device 255. Alternatively, the computer software can be accessed directly from the Internet 280 by the computer 220. In either case, a user can interact with the computer system 200 using the keyboard 210 and mouse 215 to operate the computer software program executing on the computer 220. During operation, the software instructions of the computer software program are loaded to the memory 250 for execution by the processor 240.

Other configurations or types of computer systems can be equally well used to execute computer software that assists in implementing the techniques described herein.

CONCLUSION

Extended properties, such as the one described above, can be useful for workflow debugging. Besides, if alternatives can be captured among activities, Planner4J can be run to generate other alternative plans, which can be converted to a BPEL workflow. In Planner4J, synthesis of plans with sequence, switch and flow is supported.

Embodiments of the invention find application in business process re-engineering, allowing analysis to find similar processes, process template generation and better/simpler visualization. In terms of IT workflows, embodiments offer an analytical method to find similar workflows, which is helpful in managing/storing and retrieving workflows with better metadata.

Various alterations and modifications can be made to the techniques and arrangements described herein, as would be apparent to one skilled in the relevant art.

I claim:

1. A computer-implemented method for finding similarity among activities in a Business Process Execution Language for Web Services (BPEL) workflow, said method comprising:

inputting said BPEL workflow to a processor, said BPEL workflow comprising executable basic activities and grouping activities;

automatically building a semantic action model for each of said executable basic activities and said grouping activities in said BPEL workflow using said processor, wherein said semantic action model specifies a context, associated with any of a precondition and a postcondition, for said each of said executable basic activities and said grouping activities;

automatically generating an ordered list of semantic action models corresponding to said executable basic activities and said grouping activities using said processor, based on control flow ordering information inherent to semantics of said grouping activities, and preconditions and postconditions corresponding to links from a predecessor executable basic activity and a successor executable basic activity, respectively;

using ordering information of each of said semantic action models, associated with a precondition or postcondition, as metadata, indicating said context for transforming a representation of said BPEL workflow by replacing sub-workflows with said semantic action models using said processor, wherein said metadata includes an equivalent causation, a same derived context, and a most constrained semantic action; and using said metadata to manage a transformed representation of said BPEL workflow and to determine a similarity between said transformed representation of said BPEL workflow and a plurality of stored workflow representations comprising semantic action models using said processor.

2. The method of claim 1, further comprising recursively combining said semantic action models of said representation of said BPEL workflow to build said ordered list of semantic action models corresponding to more activities of said BPEL workflow.

3. The method of claim 2, wherein precondition context metadata relates to initial conditions that enable said BPEL workflow, and postcondition context metadata relates to latest actions that are considered goals of said BPEL workflow.

4. A computer implemented method for automatically analyzing a Business Process Execution Language for Web Services (BPEL) workflow, said BPEL workflow including at least two flows, in which each flow of said at least two flows includes a sequence of activities, said method comprising:

inputting said BPEL workflow to a processor, said BPEL workflow comprising executable basic and grouping activities;

automatically building a semantic action model for each of said executable basic activities and said grouping activities in said BPEL workflow using said processor, wherein said semantic action model specifies a context, associated with any of a precondition and a postcondition, for said each of said executable basic and grouping activities;

automatically generating an ordered list of semantic action models corresponding to said executable basic activities in each said flow of said BPEL workflow using said processor, said ordered list of semantic action models specifying a precondition and a postcondition for said each executable basic activity of each said flow, said precondition and said postcondition corresponding to links from a predecessor executable basic activity and a successor executable basic activity, respectively;

using ordering information from each flow of each of said semantic action models, associated with a precondition or postcondition, as metadata, indicating said context for transforming a representation of said each flow in said BPEL workflow by replacing sub-workflows with said semantic action models using said processor,
  wherein said metadata includes an equivalent causation, a same derived context, and a most constrained semantic action; and using said metadata to manage a transformed representation of said each flow of said BPEL workflow and to determine a similarity between said transformed representation of said BPEL workflow and a plurality of stored workflow representations comprising semantic action models using said processor.

5. The method of claim 4, wherein precondition context metadata relates to initial conditions that enable said BPEL workflow, and postcondition context metadata relates to latest actions that are considered goals of said BPEL workflow.

6. A computer program storage medium readable by a computer, tangibly embodying a program of instructions executable by said computer to perform a method for automatically finding similarity among activities in a Business Process Execution Language for Web Services (BPEL) workflow, said method comprising:

inputting said BPEL workflow, said BPEL workflow comprising executable basic activities and grouping activities;

automatically building a semantic action model for each of said executable basic activities and said grouping activities in said BPEL workflow, wherein said semantic action model specifies a context, associated with any of a precondition and a postcondition, for said each of said executable basic activities and said grouping activities;

automatically generating an ordered list of semantic action models corresponding to said executable basic activities and said grouping activities, based on control flow ordering information inherent to semantics of said grouping activities, and preconditions and postconditions corresponding to links from a predecessor executable basic activity and a successor executable basic activity, respectively;

using ordering information of each of said semantic action models, associated with a precondition or postcondition, as metadata, indicating said context for transforming a representation of said BPEL workflow by replacing sub-workflows with said semantic action models,
  wherein said metadata includes an equivalent causation, a same derived context, and a most constrained semantic action; and using said metadata to manage a transformed representation of said BPEL workflow and to determine a similarity between said transformed representation of said BPEL workflow and a plurality of stored workflow representations comprising semantic action models.

7. A computer system comprising:

a memory for inputting a BPEL workflow, said BPEL workflow comprising executable basic activities and grouping activities; and a processor configured to:
  automatically build a semantic action model for each of said executable basic activities and said grouping activities in said BPEL workflow, wherein said semantic action model specifies a context, associated with any of a precondition and a postcondition, for said each of said executable basic activities and said grouping activities;
  automatically generate an ordered list of semantic action models corresponding to said executable basic activities and said grouping activities, based on control flow ordering information inherent to semantics of said grouping activities, and preconditions and postconditions corresponding to links from a predecessor executable basic activity and a successor executable basic activity, respectively;
  use ordering information of each of said semantic action models, associated with a precondition or postcondition, as metadata indicating said context for transforming a representation of said BPEL workflow by replacing sub-workflows with said semantic action models,
    wherein said metadata includes an equivalent causation, a same derived context, and a most constrained semantic action; and
  use said metadata to manage a transformed representation of said BPEL workflow and to determine a similarity between said transformed representation of said BPEL workflow and a plurality of stored workflow representations comprising semantic action models.

* * * * *